United States Patent
Lim et al.

(10) Patent No.: US 9,552,314 B2
(45) Date of Patent: Jan. 24, 2017

(54) MEMORY SYSTEM HAVING FIRST AND SECOND MEMORY DEVICES AND DRIVING METHOD THEREOF

(71) Applicant: Samsung Electronics Co., Ltd, Suwon-si, Gyeonggi-do (KR)

(72) Inventors: Sun-Young Lim, Hwaseong-si (KR); Dong-Hwi Kim, Yongin-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 496 days.

(21) Appl. No.: 14/090,521

(22) Filed: Nov. 26, 2013

(65) Prior Publication Data

US 2014/0189183 A1 Jul. 3, 2014

(30) Foreign Application Priority Data

Jan. 2, 2013 (KR) .......................... 10-2013-0000365

(51) Int. Cl.
*G06F 13/24* (2006.01)
(52) U.S. Cl.
CPC ..................................... *G06F 13/24* (2013.01)
(58) Field of Classification Search
USPC .................. 710/260–269; 711/103, 153–156
See application file for complete search history.

(56) References Cited

U.S. PATENT DOCUMENTS

| | | | |
|---|---|---|---|
| 7,953,950 B2 | 5/2011 | Fujimoto | |
| 8,225,052 B2* | 7/2012 | Galbo | G06F 13/1642 711/103 |
| 8,255,618 B1 | 8/2012 | Borchers et al. | |
| 8,286,188 B1 | 10/2012 | Brief | |
| 2008/0301381 A1* | 12/2008 | Lee | G06F 13/28 711/154 |
| 2010/0169549 A1 | 7/2010 | Yano et al. | |
| 2010/0191874 A1* | 7/2010 | Feeley | G06F 13/385 710/24 |
| 2011/0022767 A1 | 1/2011 | Chun et al. | |
| 2012/0069035 A1 | 3/2012 | Bourd et al. | |
| 2012/0254562 A1 | 10/2012 | Morrison et al. | |

FOREIGN PATENT DOCUMENTS

| | | |
|---|---|---|
| JP | 2010-157130 | 7/2010 |
| KR | 10-1996-0024931 | 7/1996 |
| KR | 10-1999-0048631 | 7/1999 |
| KR | 10-0317976 | 12/2001 |
| KR | 10-2011-0011528 | 2/2011 |

* cited by examiner

*Primary Examiner* — Raymond Phan
(74) *Attorney, Agent, or Firm* — Muir Patent Law, PLLC

(57) ABSTRACT

A memory system includes first and second memory devices, a memory controller configured to control the second memory device, to store a request signal to access the first memory device, and to generate an interrupt signal, and a host configured to receive the request signal in response to the interrupt signal.

17 Claims, 12 Drawing Sheets

MEMORY SYSTEM HAVING FIRST AND SECOND MEMORY DEVICES AND DRIVING METHOD THEREOF

CROSS-REFERENCE TO RELATED APPLICATIONS

This application claims the benefit of priority under 35 U.S.C. §119 to Korean Patent Application No. 10-2013-0000365, filed on Jan. 2, 2013, the content of which is incorporated herein in its entirety by reference.

BACKGROUND

1. Field

An embodiment of the inventive concept relates to a memory system, and more particularly, to a memory system configured to request data from a host (e.g. a memory controller) and a driving method thereof.

2. Description of the Related Art

A host (e.g. a memory controller) generally operates to unilaterally access a memory device. The memory device merely responds to a request from the memory controller, but cannot itself request data from the memory controller.

For example, in a memory device that includes a plurality of internal memory blocks, the memory device is not allowed to request data from the host when a certain internal memory block and another internal memory block are exchanging data with each other.

SUMMARY

The present inventive concept provides a memory system configured to request data from a host.

The present inventive concept also provides a method for driving such a memory system.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a memory system comprising first and second memory devices, a first memory controller configured to control the second memory device, to store a request signal to access the first memory device, and to generate a interrupt signal, and a host configured to receive the request signal in response to the interrupt signal.

In an exemplary embodiment, the first memory device may be a volatile memory device.

In an exemplary embodiment, the second memory device may be a nonvolatile memory device and the memory controller may be a nonvolatile memory controller.

In an exemplary embodiment, the host may include a host queue configured to store the request signal and the host queue may be configured to operate as a FIFO memory.

In an exemplary embodiment, the host queue may be configured to store a command fetched by the host.

In an exemplary embodiment, the request signal may include information about a place from which data is read, a place in which the data is stored, and a size of the data.

In an exemplary embodiment, the host may include a second memory controller configured to control the first memory device.

In an exemplary embodiment, the first memory controller may include a memory queue configured to store at least a command for accessing the first memory device.

In an exemplary embodiment, the host may be configured to transfer data from at least one of the first memory device to the second memory device, and the data from the second memory device to the first memory device.

In an exemplary embodiment, the data may include metadata of the nonvolatile memory device.

In an exemplary embodiment, the first and second memory devices may be implemented in a multi-chip package.

The foregoing and/or other features and utilities the present inventive concept also provide a method of driving a memory system having first and second memory device, a memory controller configured to control the second memory device, and a host configured to control the memory controller the method comprising storing a request signal, which may be used to access the first memory device, in the memory controller, and transferring an interrupt signal to the host.

In an exemplary embodiment, the method may further include reading the request signal in response to the interrupt signal.

In an exemplary embodiment, the method may further include storing the request signal in the host.

In an exemplary embodiment, the method may further include executing the request signal, wherein the executing the request signal may include at least one of transferring data from the first memory device to the second memory device and transferring the data from the second memory device to the first memory device.

The foregoing and/or other features and utilities of the present inventive concept also provide a memory system comprising a long-term memory and a temporary memory, and a first memory controller and a second memory controller, wherein the first memory controller is configured to send a first signal to the second memory controller, the second memory controller is configured to fetch, responsive to the first signal, a second signal from the first memory controller and to cause, responsive to the second signal, first data to be transferred from the long-term memory to the temporary memory.

In an exemplary embodiment, the first memory controller may be further configured to send the first signal if the first data is divisionally stored in the long-term memory and a buffer of the first memory controller.

In an exemplary embodiment, the first data may include metadata having information about a position of second data and a range of the second data.

In an exemplary embodiment, the first memory controller may be further configured to send the second signal from a queue of the first memory controller to a register of the first memory controller.

In an exemplary embodiment, the long-term memory, the temporary memory, and the first memory controller may be collectively packaged as a semiconductor memory device.

BRIEF DESCRIPTION OF THE DRAWINGS

These and/or other features and utilities of the present inventive concept will become apparent and more readily appreciated from the following description of the embodiments, taken in conjunction with the accompanying drawings of which.

DETAILED DESCRIPTION OF THE EMBODIMENTS

Figure 1:
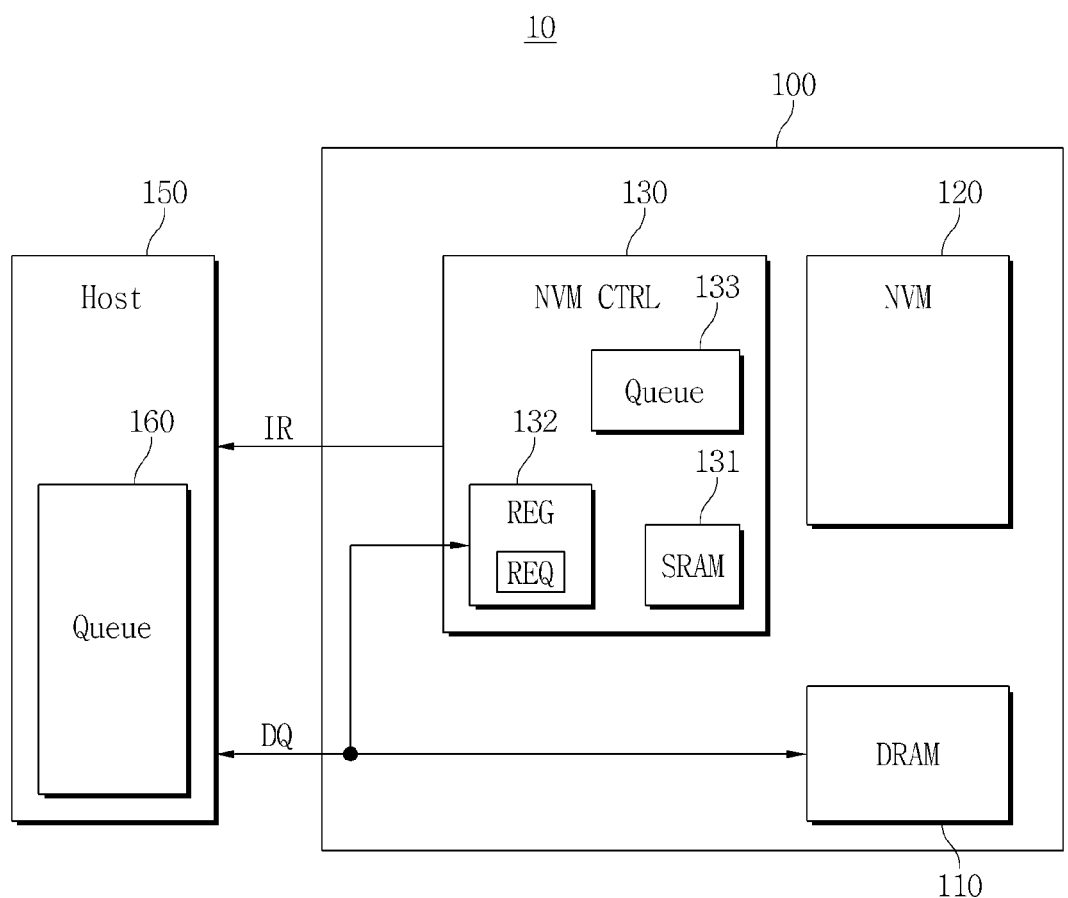
FIG. 1 is a block diagram illustrating a memory system, according to an embodiment of the present inventive concept.

Embodiments of the inventive concept are described below in sufficient detail to enable those of ordinary skill in the art to embody and practice the inventive concept. It is important to understand that the inventive concept may be embodied in many alternate forms and should not be construed as limited to the embodiments set forth herein.

Accordingly, while the inventive concept is susceptible to various modifications and may take on various alternative forms, specific embodiments thereof are shown by way of example in the drawings and will herein be described in detail. It should be understood, however, that there is no intent to limit the inventive concept to the particular forms disclosed. On the contrary, the inventive concept is to cover all modifications, equivalents, and alternatives falling within the spirit and scope of the claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the inventive concept.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein to describe embodiments of the inventive concept is not intended to limit the scope of the inventive concept. The articles "a," "an," and "the" are singular in that they have a single referent, however the use of the singular form in the present document should not preclude the presence of more than one referent. In other words, elements of the inventive concept referred to in the singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a block diagram illustrating a memory system 10, according to an exemplary embodiment of the present inventive concept.

Referring to FIG. 1, the memory system 10 may include a semiconductor memory device 100 and a host 150. The semiconductor memory device 100 may include a first memory device 110, a second memory device 120, and a memory controller 130 configured to control the second memory device 120. The first memory device 110 may temporarily store data for managing a system. According to an embodiment, the first memory device 110 may be implemented, for example, as a dynamic random access memory (DRAM).

The second memory device 120 may store mass data for a long time. According to an embodiment, the second memory device 120 may be implemented, for example, as a nonvolatile memory device. The nonvolatile memory device may be, for example, a NAND Flash Memory, a vertical NAND flash memory, a NOR Flash memory, a Resistive Random Access Memory (RRAM), a Phase-Change Memory (PRAM), a Magnetroresistive Random Access Memory (MRAM), a Ferroelectric Random Access Memory (FRAM), or a Spin Transfer Torque Random Access Memory (STT-RAM). The nonvolatile memory device may be implemented, for example, as a three-dimensional array structure. The second memory device 120, according to an embodiment of the present inventive concept, may comprise at least one of a flash memory device, whose charge storage layer may be formed of a conductive floating gate, and a Charge Trap Flash (CTF) memory, whose charge storage layer may be formed of an isolation film.

The memory controller 130 may be implemented, for example, as a nonvolatile memory controller configured to control a nonvolatile memory device. The memory controller 130 may include, for example, a static random access memory (SRAM) 131 configured to be used as a buffer, a register 132 configured to store a request signal REQ, and a memory queue 133 configured to store a command requested from the memory controller 130. According to an embodiment, the memory queue 133 may be implemented, for example, as a first-in first-out (FIFO) memory or driven in a manner similar to a FIFO memory. The register 132, according to an embodiment of the present inventive concept, is described later in detail with reference to FIG. 2.

The host 150 may access each of the first and second memory devices 110 and 120 through a data path DQ. The host 150 may include a host queue 160 configured to store commands to access, respectively, the first and second memory devices 110 and 120. According to an embodiment, the host 150 may be implemented as a DRAM controller, and the host queue 160 may be implemented as a FIFO memory or driven in a manner similar to a FIFO memory.

The host 150 may execute any of the commands stored in the host queue 160. The commands stored in the host queue 160 may include a command to access any of the first and second memory devices 110 and 120.

The host 150 may unilaterally access the first memory device 110 or the second memory device 120. However, the first memory device 110 or the second memory device 120 may not access the host 150.

In order to resolve this problem, the memory system 10, according to an embodiment of the present inventive concept, may be operable to transfer a request signal REQ to the host 150. For example, the memory controller 130 may transfer an interrupt signal IR to the host 150.

Upon receiving the interrupt signal IR, the host 150 may fetch the request signal REQ from the register 132 of the memory controller 130. The host 150 may store the request signal REQ in the host queue 160. The host 150 may sequentially process commands that are stored in the host queue 160.

In this manner, the memory system 10 may transfer the request signal REQ to the host 150 through the data path DQ.

The host 150 may also use metadata to quickly access the second memory device 120, which may be a nonvolatile memory device. The metadata may include positional information about a data range in the second memory device 120. Namely, the host 150 may rapidly access the second memory device 120 using the metadata and quickly mount the semiconductor memory device 100.

For example, the metadata may be stored in the SRAM 131. However, if the SRAM 131 lacks sufficient capacity, the metadata may be divisionally stored in the SRAM 131 and the second memory device 120. For this reason, performance of the second memory device 120 may be degraded.

To solve this problem, the second memory device 120 may transfer the interrupt signal IR to the host 150 in order to store the metadata in the first memory device 110. The host 150 may execute a command to store the metadata in the first memory device 110. Using the metadata, the host 150 may transfer data from the first memory device 110 to the second memory device 120. Also, using the metadata, the host 150 may transfer data from the second memory device 120 to the first memory device 110.

Figure 2:
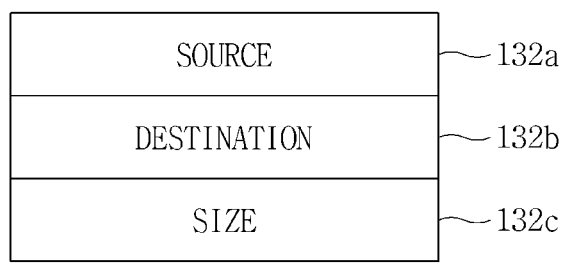
FIG. 2 is a block diagram illustrating an example of a register shown in FIG. 1, according to an embodiment of the present inventive concept.

FIG. 2 is a block diagram illustrating an example of the register 132 shown in FIG. 1, according to an embodiment of the present inventive concept.

Referring to FIG. 1 and FIG. 2, the register 132 may store the request signal REQ. The request signal REQ may comprise a source 132a, a destination 132b, and a size 132c. The source 132a may include information about a location at which to access data. The destination 132b may include information about a location at which to store the data. The size 132c may include information about a size of the data to be accessed.

For example, in a writing operation for the second memory device 120, a specific address of the first memory device 110 may be the source 132a, the SRAM 131 may be the destination 132b, and a size of the data stored in the specific address of the first memory device 110 may be the size 132c.

Alternatively, in a reading operation for the second memory device 120, the SRAM 131 may be the source 132a. A specific address of the first memory device 110 may be the destination 132b.

Figure 3:
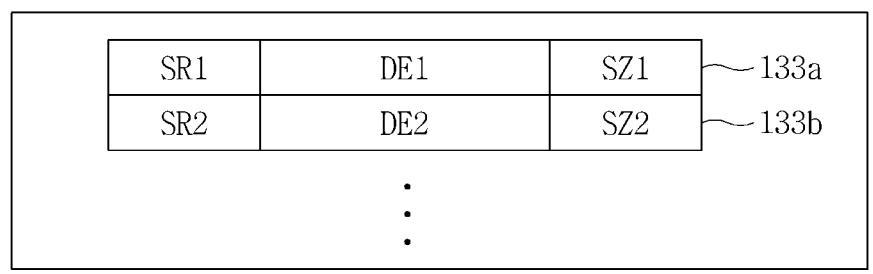
FIG. 3 is a block diagram illustrating an example of a memory queue shown in FIG. 1, according to an embodiment of the present inventive concept.

FIG. 3 is a block diagram illustrating an example of the memory queue 133 shown in FIG. 1, according to an embodiment of the present inventive concept.

Referring to FIG. 1 through FIG. 3, the memory queue 133 may store the first and second commands 133a and 133b. For example, the first or second command 133a or 133b may enable data to be read from the first memory device 110 or enable data to be written into the first memory device 110.

Each of the first and second commands 133a and 133b may comprise a source 132a, a destination 132b, and a size 132c, respectively. The first command 133a may have a first source SR1, a first destination DE1, and a first size SZ1. The second command 133b may have a second source SR2, a second destination DE2, and a second size SZ2. The memory queue 133 may store at least one command therein.

For example, if the first command 133a is a command for reading the first memory device 110, the host 150 may read a specific address of the first memory device 110 from a mode register (MR) and write the read data into the SRAM 131.

Generally, in a DRAM setting, an operation mode to be used by the host 150 is predefined with timing information, such as, for example, a column address strobe (CAS) latency or a burst length. A mode register may be used to set and to store such an operation mode. An aggregation of such mode registers is referred to as a mode register set (MRS).

Figure 4:
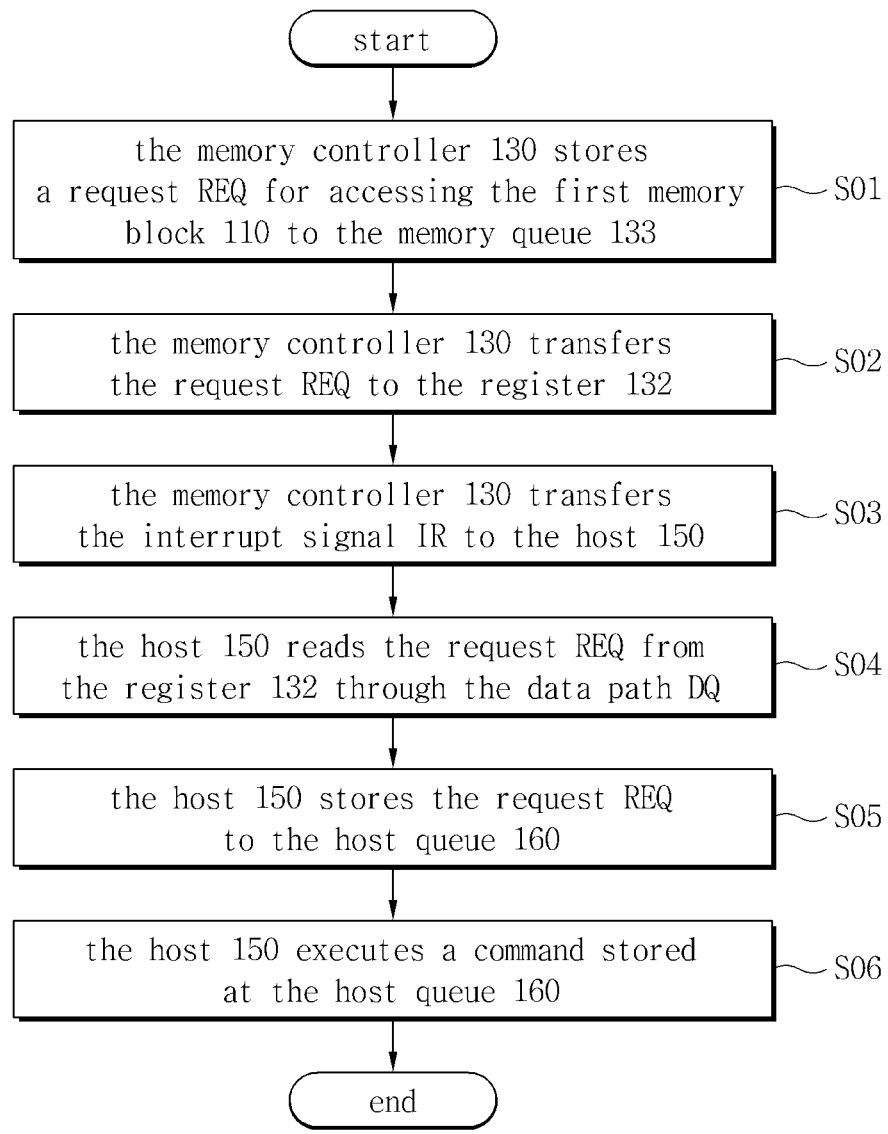
FIG. 4 is a flowchart illustrating an example of an operation of a memory system shown in FIG. 4, according to an embodiment of the present inventive concept.

FIG. 4 is a flowchart illustrating an example of an operation of the memory system 10 of FIG. 1, according to an embodiment of the present inventive concept.

Referring to FIG. 1 through FIG. 4, in an operation S01, the memory queue 133 may store the request signal REQ to access the first memory device 110. For example, the request signal REQ may be a command for writing data, which is stored at a specific address of the first memory device 110, into the second memory device 120. Accordingly, the source 132a of the request signal REQ may be the specific address of the first memory device 110. The destination 132b of the request signal REQ may be the SRAM 131. The size 132c of the request REQ may be a size of the data to be requested.

In an operation S02, the memory controller 130 may transfer the request signal REQ to the register 132.

In an operation S03, the memory controller 130 may transfer the interrupt signal IR to the host 150.

In an operation S04, in response to the interrupt signal IR, the host 150 may read the request signal REQ from the register 132 through the data path DQ.

In an operation S05, the host 150 may store the request signal REQ in the host queue 160.

In an operation S06, the host 150 may sequentially execute commands that are stored in the host queue 160. For example, if the host 150 executes the request signal REQ, the host 150 may store data from the second memory device 120 in the SRAM 131.

Operations S01 through S06, when performed in memory system 10, may prevent the host 150 and the memory controller 130 from coincidentally attempting to access the first memory device 110.

If metadata with respect to the second memory device 120 is stored in the first memory device 110, the host 150 may access the second memory device 120 more efficiently. Thus, performance of the memory system 10 may be improved.

Figure 5:
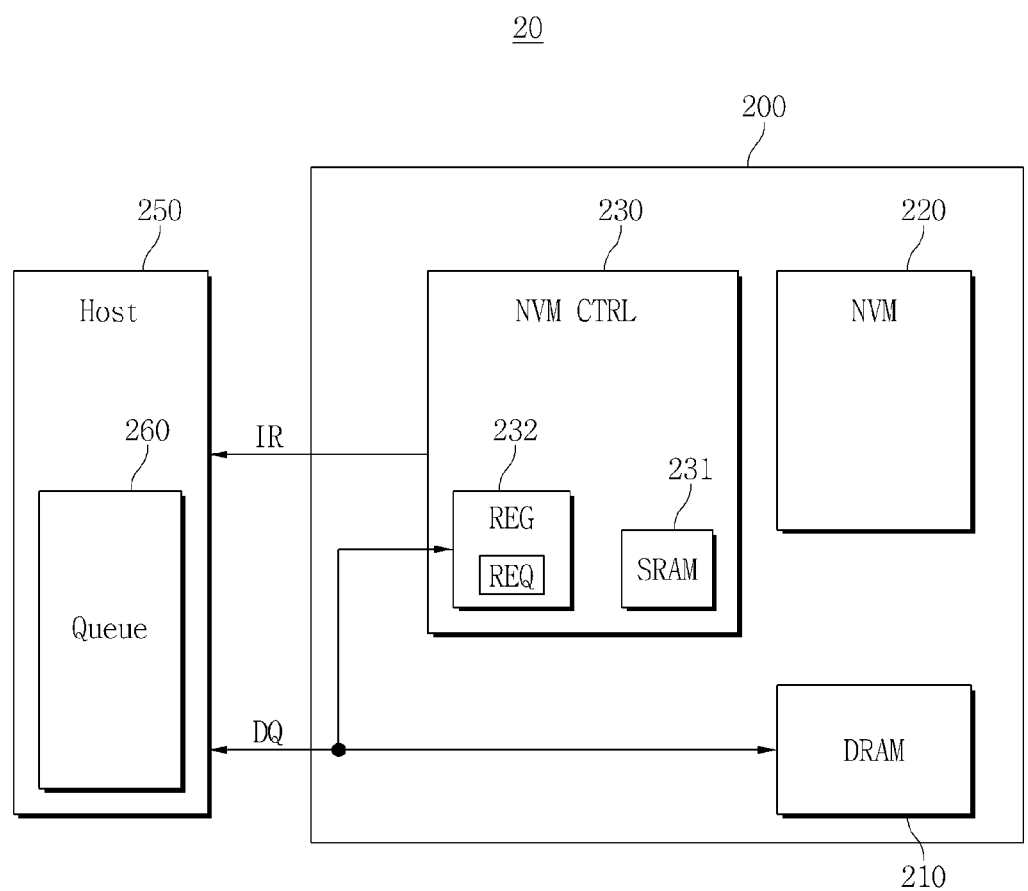
FIG. 5 is a block diagram illustrating a memory system, according to an embodiment of the present inventive concept.

FIG. 5 is a block diagram illustrating an example of a memory system 20, according to an embodiment of the present inventive concept.

Referring to FIG. 5, the memory system 20 may include a semiconductor memory device 200 and a host 250. The semiconductor memory device 200 may include a first memory device 210, a second memory device 220, and a memory controller 130 configured to control the second memory device 220. The first memory device 210 may temporarily store data for managing a system.

The second memory device 220 may store mass data for a long time. According to an embodiment, the second memory device 220 may be implemented, for example, as a nonvolatile memory device. The memory controller 230 may include, for example, an SRAM 231 configured to be used as a buffer, and a register 233 configured to store a request signal REQ. The memory controller 230 may be implemented, for example, as a nonvolatile memory controller configured to control the nonvolatile memory device.

The host 250 may access each of the first and second memory devices 210 and 220 through a data path DQ. The host 250 may include a host queue 260 configured to store commands to access, respectively, the first and second memory devices 210 and 220. According to an embodiment, the host 250 may be implemented as a DRAM controller, and the host queue 260 may be implemented as a FIFO memory.

The host 250 may execute a first one of the commands that are stored in the host queue 260. The commands stored in the host queue 260 may include a command to access any of the first and second memory devices 210 and 220.

The host 250 may unilaterally access the first memory device 210 or the second memory device 220. However, the first memory device 210 or the second memory device 220 may not access the host 250.

However, the memory system 20, according to an embodiment of the present inventive concept, may transfer the request signal REQ to the host 250. For example, the memory controller 230 may transfer the interrupt signal IR to the host 250.

If the host 250 receives the interrupt signal IR, the host 250 may fetch the request signal REQ from the register 232 of the memory controller 230. The host 250 may store the request signal REQ in the host queue 260. The host 250 may sequentially process commands that are stored in the host queue 260.

In this manner, the memory system 20 may transfer the request signal REQ to the host 250 through the data path DQ.

For the semiconductor memory device 200 shown in FIG. 5, a memory queue may not be included in the memory controller 230. Therefore, if the memory controller 230 needs to access the first memory device 210, the memory controller 230 may store the request signal REQ in the register 232 and may transfer the interrupt signal IR to the host 250.

Figure 6:
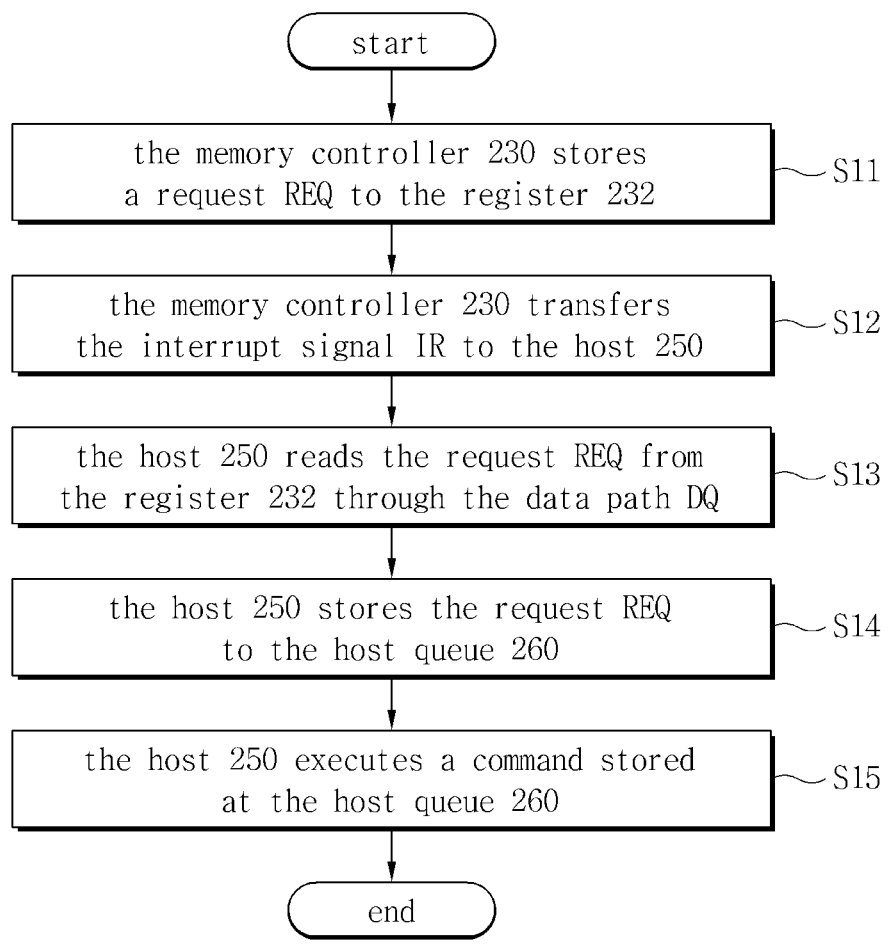
FIG. 6 is a flowchart illustrating an example of an operation of a memory system shown in FIG. 5, according to an embodiment of the present inventive concept.

FIG. 6 is a flowchart illustrating an example of an operation of the memory system 20 of FIG. 5, according to an embodiment of the present inventive concept.

Referring to FIG. 5 and FIG. 6, in an operation S11, the memory controller 230 may store the request signal REQ, which is used to access the first memory device 110, in the register 232. For example, the request signal REQ may be a command for writing a data from a specific address of the first memory device 210 into the second memory device 220. Thus, the source of the request signal REQ may be the specific address of the first memory device 210. The destination of the request REQ may be the SRAM 231. The size of the request REQ may be a size of the data to be requested.

In an operation S12, the memory controller 230 may transfer the interrupt signal IR to the host 250.

In an operation S13, in response to the interrupt signal IR, the host 250 may read the request signal REQ from the register 232 through the data path DQ.

In an operation S14, the host 250 may store the request signal REQ in the host queue 260.

In an operation S15, the host 250 may sequentially execute commands that are stored in the host queue 260. For example, assuming that the host 250 executes the request signal REQ, the host 250 may store data from the first memory device 210 in the SRAM 231. The memory controller 230 may also store data from the SRAM 231 to the second memory device 220.

Figure 7:
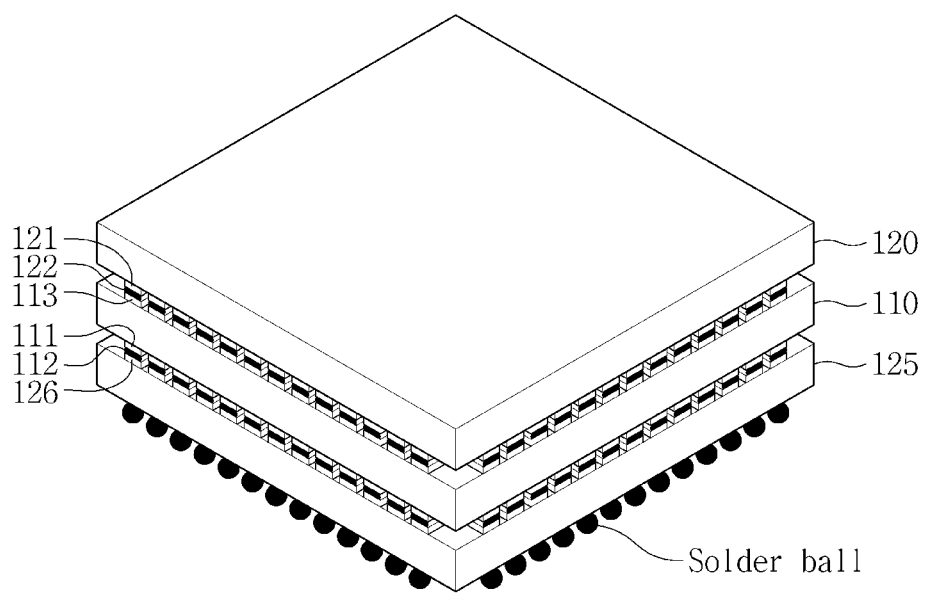
FIG. 7 is a perspective diagram illustrating an example of a multi-chip package that may include the semiconductor memory devices shown in FIGS. 1 and 5, according to an embodiment of the present inventive concept.

FIG. 7 is a perspective diagram illustrating an example of a multi-chip package 1100 that may include the semiconductor memory devices 100 and 200 shown in FIGS. 1 and 5, according to an embodiment of the present inventive concept.

Referring to FIG. 7, the multi-chip package 1100 is shown in perspective. A plurality of pads 121 may be attached under the second memory device 120. The plurality of pads 121 may be respectively attached to a plurality of microbumps 122.

A plurality of pads 113 may be attached on the first memory device 110. The plurality of pads 113 may be respectively electrically connected to the plurality of microbumps 122.

A plurality of pads 111 may be attached under the first memory device 110 and a plurality of microbumps 112 may be respectively attached to the plurality of pads 111. The pluralities of microbumps 112 and 122 may be formed, for example, in a hemisphere or a convex shape, and may contain, for example, at least one of a nickel, gold, copper, or solder alloy.

The top of a substrate 125 may include a plurality of pads 126 for electrical connection with the plurality of microbumps 112 of the first memory device 110. The bottom of the substrate 125 may include a plurality of solder balls for connection with the host 150. According to an embodiment, the substrate 125 may be included in a printed circuit board (PCB).

Figure 8:
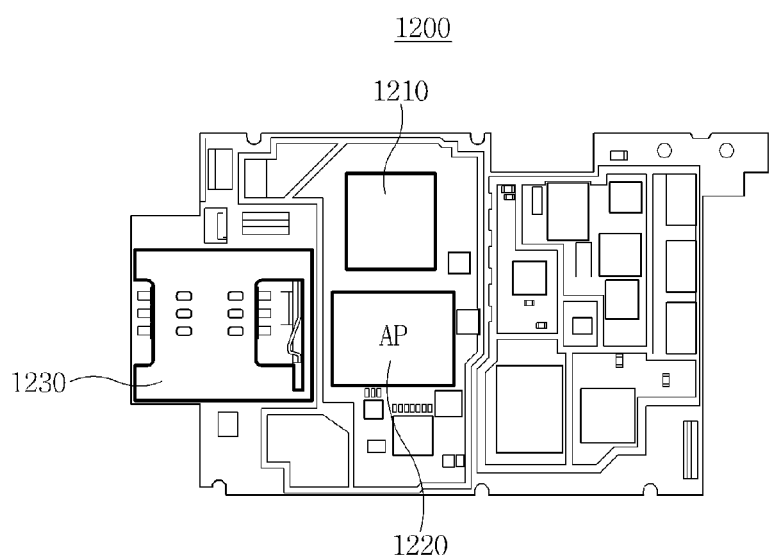
FIG. 8 illustrates an example of a main board that may include the multi-chip package shown in FIG. 7, according to an embodiment of the present inventive concept.

FIG. 8 illustrates an example of a main board 1200 that may include the multi-chip package 1100 shown in FIG. 7, according to an embodiment of the present inventive concept.

Referring to FIG. 8, the main board 1200 may be included in a smart phone, a tablet personal computer (PC), etc.

The main board 1200 may include a semiconductor memory device 1210, an application processor 1220 configured to access the semiconductor memory device 1210, and a memory socket 1230 configured to interface with an external memory device. The main board 1200, which may be referred to as a mother board, may be basic hardware, including basic circuits and components, necessary for a computer system.

According to an embodiment, the main board 1200 may be implemented in hardware, comprising, for example, a mobile device. The semiconductor memory device 120 may be implemented, for example, in a type of the multi-chip package 1100 shown in FIG. 7.

Figure 9:
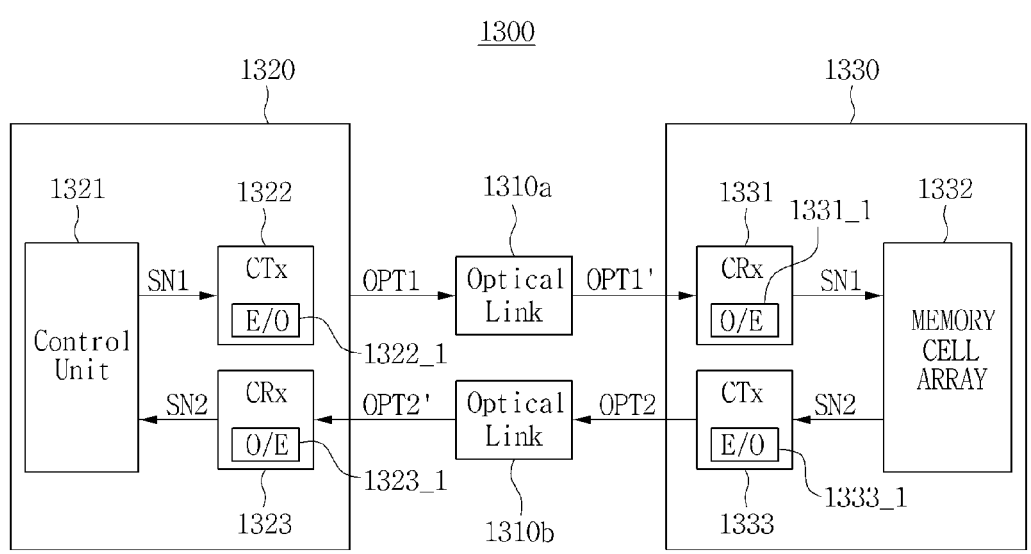
FIG. 9 is a block diagram illustrating an example of a memory system that may include the semiconductor memory device shown in FIG. 1 and optical links, according to an embodiment of the present inventive concept.

FIG. 9 is a block diagram illustrating an example of a memory system 1300 that may include the semiconductor memory device 100 shown in FIG. 1 and optical links, according to an embodiment of the present inventive concept.

Referring to FIG. 9, the memory system 1300 may include a controller 1320, a semiconductor memory device 1330, and a plurality of optical links 1310a and 1310b that interconnect the controller 1320 and the semiconductor memory device 1330 to each other. The controller 1320 may include a control unit 1321, a first transmitter 1322, and a first receiver 1323. The control unit 1321 may transfer a control signal SN1 to the first transmitter 1322.

The first transmitter 1322 may include a first optical modulator 1322_1. The first optical modulator 1322_1 may convert the control signal SN1, which is an electric signal, into a first optical transmission signal OPT1, and may transmit the first optical transmission signal OPT1 to the optical link 1310a.

The first receiver 1323 may include a first optical demodulator 1323_1. The first optical demodulator 1323_1 may convert a second optical receiving signal OPT2', which may be received from the optical link 1310b, into a data signal SN2, which is an electric signal, and may transmit the data signal SN2 to the control unit 1321.

The semiconductor memory device 1330 may include a second receiver 1331, a memory cell array 1332, and a second transmitter 1333. The second receiver 1331 may include a second optical demodulator 1331_1. The second optical demodulator 1331_1 may convert a first optical receiving signal OPT1', which may be received from the optical link 1310a, into the control signal SN1, which is an electric signal, and transmits the control signal SN1 to the memory cell array 1332.

Data may be written into the memory cell array 1332 under the control of the control signal SN1. The data signal SN2 may be output from the memory cell array 1332 and may be transmitted by the second transmitter 1333.

The second transmitter 1333 may include a second optical modulator 1333_1. The second optical modulator 1333_1 may convert the data signal SN2, which is an electric signal, into a second optical data signal OPT2, and may transmit the second optical data signal OPT2 to the optical link 1310b.

According to an embodiment, the semiconductor memory device 1330 may include the semiconductor memory devices 100 and 200 shown in FIGS. 1 and 5.

Figure 10:
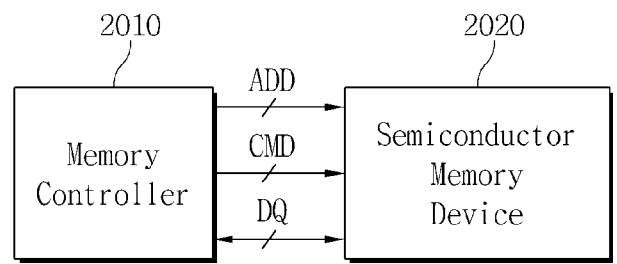
FIG. 10 is a block diagram illustrating an example of a memory system that may include the semiconductor memory device shown in FIG. 1, according to an embodiment of the present inventive concept.

FIG. 10 is a block diagram illustrating an example of a memory system 2000 that may include the semiconductor memory device 100 shown in FIG. 1, according to an embodiment of the present inventive concept.

Referring to FIG. 10, the memory system 2000 may include a memory controller 2010 and a semiconductor memory device 2020.

The memory controller 2010 may generate an address signal ADD and a command CMD, and may provide the address signal ADD and the command CMD to the semiconductor memory device 2020 through buses. Data DQ may be transmitted from the memory controller 2010 to the semiconductor memory device 2020 through the buses, or may transmitted from the semiconductor memory device 2020 to the memory controller 2010 through the buses.

According to an embodiment, the semiconductor memory device 2020 may include the semiconductor memory devices 100 and 200 shown in FIGS. 1 and 5.

Figure 11:
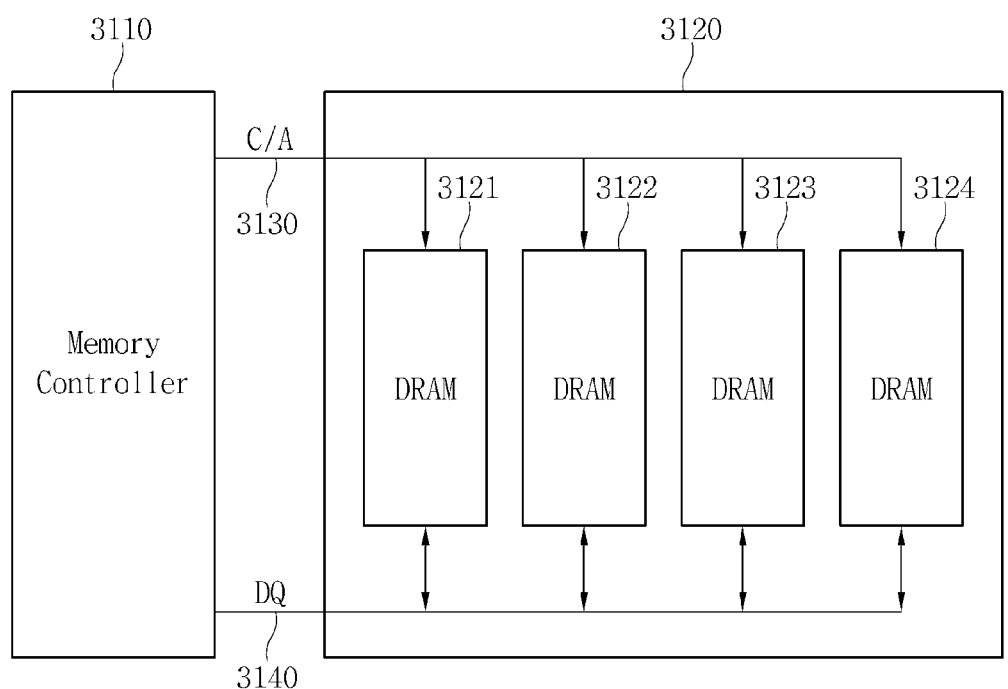
FIG. 11 is a block diagram illustrating an example of a memory system that may include the semiconductor memory device shown in FIG. 1 or 5, according to an embodiment of the present inventive concept.

FIG. 11 is a block diagram illustrating an example of a memory system 3100 that may include the semiconductor memory device 100 or 200 shown in FIG. 1 or 5, according to an embodiment of the present inventive concept.

Referring to FIG. 11, the memory system 3100 may include a memory controller 3110 and a memory module 3120.

Although the memory module 3120 is shown in FIG. 11 as including four DRAMs 3121, 3122, 3123, and 3124, one having skill in the art understands that the memory module 3120 may include more DRAMs. The first to fourth DRAMs 3121 through 3124 may be attached to both sides of a substrate (not shown) of the memory module 3120.

The memory controller 3110 may generate a command/address signal C/A and a data signal DQ. The memory module 3120 may operate in response to the command/address signal C/A and the data signal DQ. The command/address signal C/A may be, for example, packet data in which a command signal is combined with an address signal in a packet type.

The command/address bus 3130 may have, for example, a fly-by structure that electrically connects the four DRAMs 3121 through 3124 with each other. The data signal DQ may be transceived through the data bus 3140 between the memory controller 3110 and the first to fourth DRAMs 3121 through 3124 that comprise the memory module 3120.

According to an embodiment, the memory module 3120 may include the semiconductor memory devices 100 and 200 shown in FIGS. 1 and 5.

Figure 12:
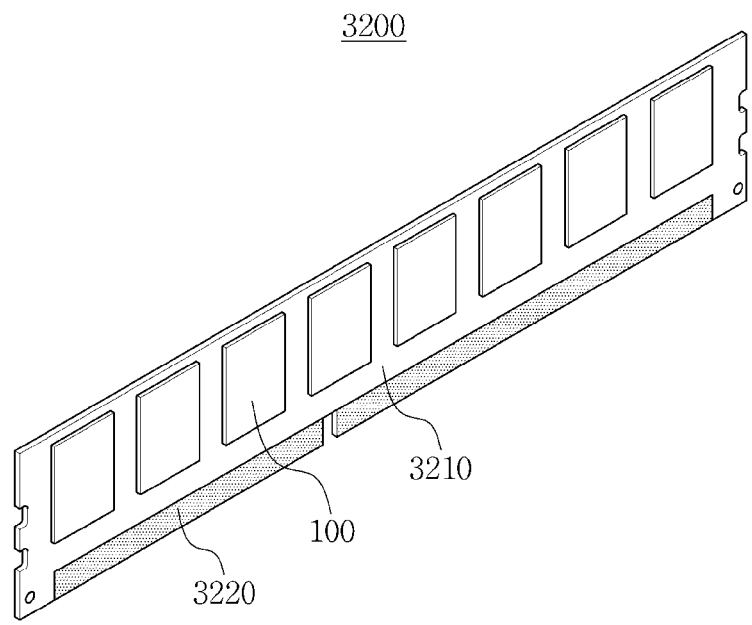
FIGS. 12 through 14 are diagrams illustrating examples of memory modules, each of which may include the semiconductor memory device shown in FIG. 1 or 5, according to an embodiment of the present inventive concept.
Figure 13:
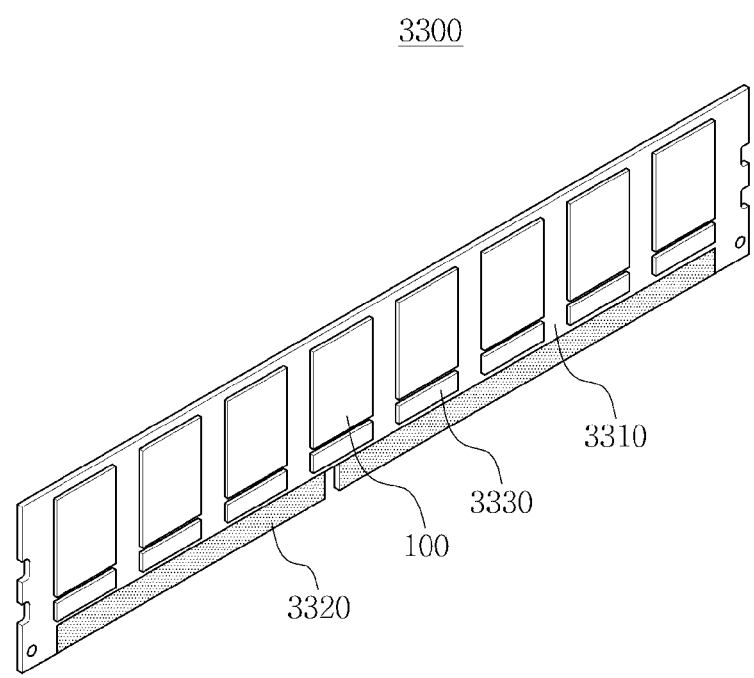
Figure 14:
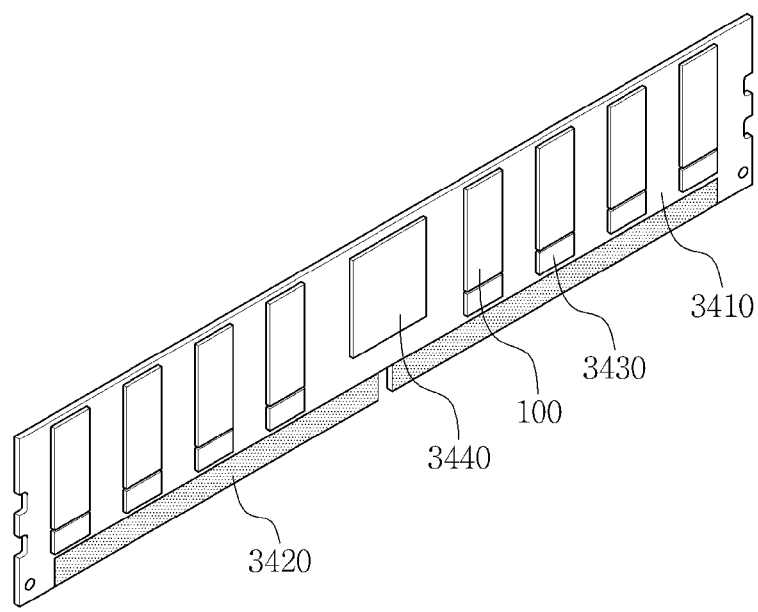

FIGS. 12 through 14 are diagrams illustrating examples of memory modules 3200, 3300, and 3400, each of which may include the semiconductor memory device 100 or 200 shown in FIG. 1 or 5, according to an embodiment of the present inventive concept.

Referring to FIG. 12, the memory module 3200 may include a plurality of the semiconductor memory devices 100, a printed circuit board (PCB) 3210, and a connector 3220. The plurality of the semiconductor memory devices 100 may be bonded to the top and bottom surfaces of the PCB 3210. The connector 3220 may be electrically connected to the plurality of the semiconductor memory devices 100 using conductive wires (not shown). The connector 3220 may be coupled to a slot of an external host (not shown).

Referring to FIG. 13, the memory module 3330 may include a plurality of the semiconductor memory devices 100, a PCB 3310, a connector 3320, and a plurality of buffers 3330. The plurality of buffers 3330 may be disposed between the semiconductor memory devices 100 and the connector 3320.

The plurality of buffers 3330 may be coupled to the plurality of the semiconductor memory devices 100 and may be provided on the top and bottom surfaces of the PCB 3310. The semiconductor memory devices 100 and the plurality of buffers 3330, which may be formed on the top and bottom surfaces of the PCB 4210, may be connected to each other through a plurality of via holes (not shown).

Referring to FIG. 14, the memory module 3400 may include a plurality of the semiconductor memory devices 100, a PCB 3410, a connector 3420, a plurality of buffers 3430, and a controller 3440.

The plurality of buffers 3430 may be coupled to the plurality of the semiconductor memory devices 100 and may be provided on the top and bottom surfaces of the PCB 3410. The semiconductor memory devices 100 and the plurality of buffers 3430, which may be formed on the top and bottom surfaces of the PCB 3410, may be connected to each other through a plurality of via holes (not shown). The controller 3440 may transfer a control signal to each of the semiconductor memory devices 100, and may transceive data to or from each of the semiconductor memory devices 100.

Figure 15:
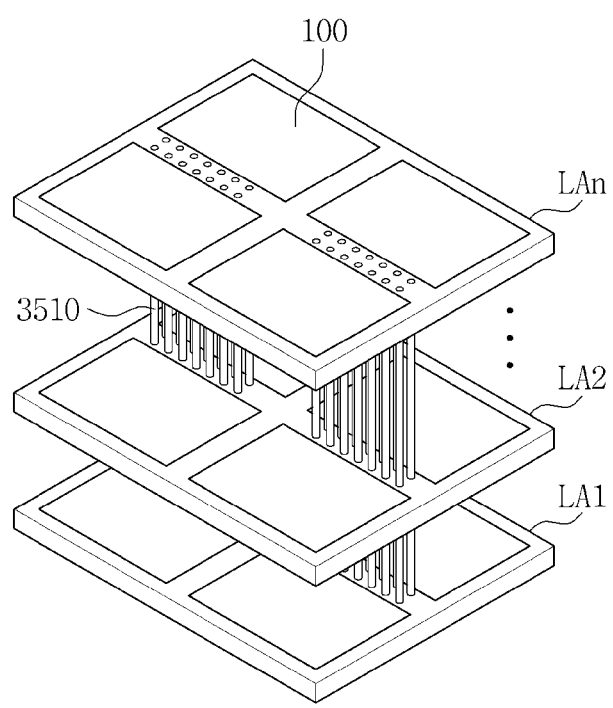
FIG. 15 is a perspective diagram illustrating a stacked semiconductor device that may include a plurality of semiconductor layers, according to an embodiment of the present inventive concept.

FIG. 15 is a perspective diagram illustrating a stacked semiconductor device 3500 that may include a plurality of semiconductor layers, according to an embodiment of the present inventive concept. In the memory module structures shown in FIGS. 12 through 14, the semiconductor memory devices 100 may include a plurality of semiconductor layers LA1 through LAn.

Referring to FIG. 15, in the stacked semiconductor device 3500, the plurality of stacked semiconductor layers LA1~LAn may be connected to each other through, for example, through-silicon vias (TSVs) 3510.

Figure 16:
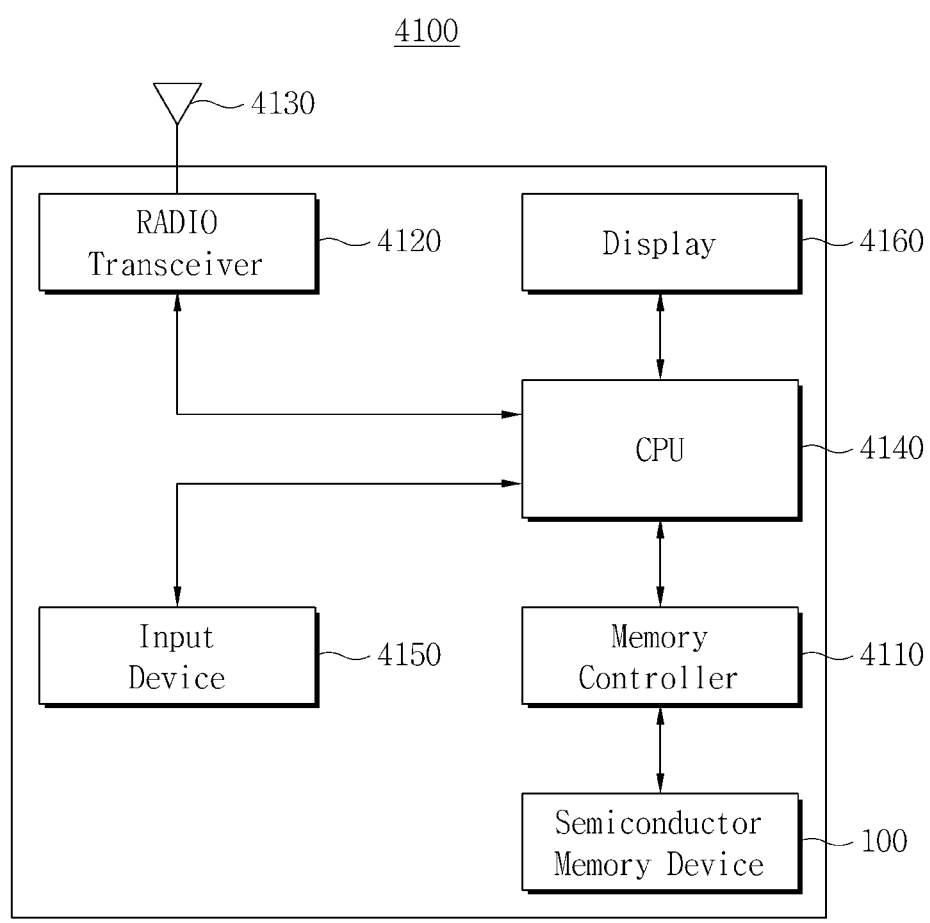
FIG. 16 is a block diagram illustrating an example of a computer system that includes the semiconductor memory device shown in FIG. 1 or 5, according to an embodiment of the present inventive concept.

FIG. 16 is a block diagram illustrating an example of a computer system 4100 that may include the semiconductor memory device 100 or 200 shown in FIG. 1 or 5, according to an embodiment of the present inventive concept.

Referring to FIG. 16, the computer system 4100 may include the semiconductor memory device 100, a memory controller 4110 configured to control the semiconductor memory device 100, a wireless transceiver 4120, an antenna 4130, a central processing unit (CPU) 4140, an input device 4150, and a display 4160.

The wireless transceiver 4120 may transfer and receive a wireless signal through the antenna 4130. For example, the wireless transceiver 4120 may modulate the wireless signal, which is received by the antenna 4130, into a signal that can be processed in the CPU 4140.

The CPU 4140 may process the signal output from the wireless transceiver 4120, and may transfer the processed signal to the display 4160. The wireless transceiver 4120 may modulate the signal, which is output from the CPU 4140, into a wireless signal, and may output the modulated wireless signal through the antenna 4130 to an external device (e.g. a host) (not shown).

The input device 4150 may be configured to input a control signal to control an operation of the CPU 4140, or to input data to be processed by the CPU 4140. The input device 4150 may be implemented, for example, as a touch pad, a keypad, a keyboard, or a pointing device such as a computer mouse.

Figure 17:
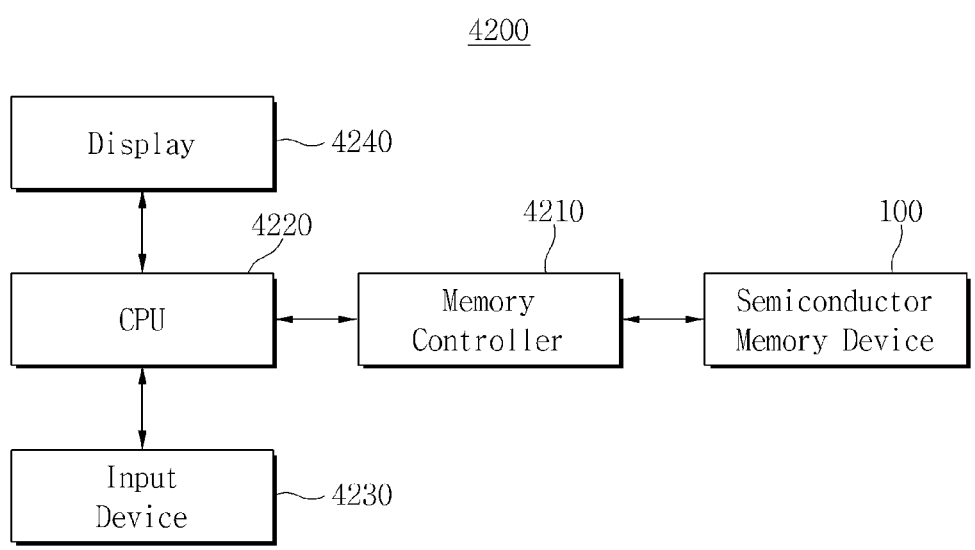
FIG. 17 is a block diagram illustrating another example of a computer system that may include the semiconductor memory device shown in FIG. 1 or 5, according to an embodiment of the present inventive concept.

FIG. 17 is a block diagram illustrating another example of a computer system 4200 that may include the semiconductor memory device 100 or 200 shown in FIG. 1 or 5, according to an embodiment of the present inventive concept.

Referring to FIG. 17, the computer system 4200 may be implemented, for example, as a personal computer (PC), a network server, a tablet PC, a net-book, an e-reader, a personal digital assistant (PDA), a portable multimedia player (PMP), an MP3 player, or an MP4 player.

The computer system 4200 may include the semiconductor memory device 100, a memory controller 4210 configured to control the semiconductor memory device 100, a CPU 4220, an input device 4230, and a display 4240.

The CPU 4220 may cause data, which may be stored in the semiconductor memory device 100, to be displayed on the display 4240 in response to data input from the input device 4230. For example, the input device 4230 may be implemented, for example, as a touch pad, a keypad, a keyboard, or a pointing device such as a computer mouse. The CPU 4220 may control an overall operation of the computer system 4200 and may manage an operation of the memory controller 4210.

According to an embodiment, the memory controller 4210, which may be configured to control an operation of the semiconductor memory device 100, may be implemented as a part of the CPU 4220 or in another chip in addition to the CPU 4220.

Figure 18:
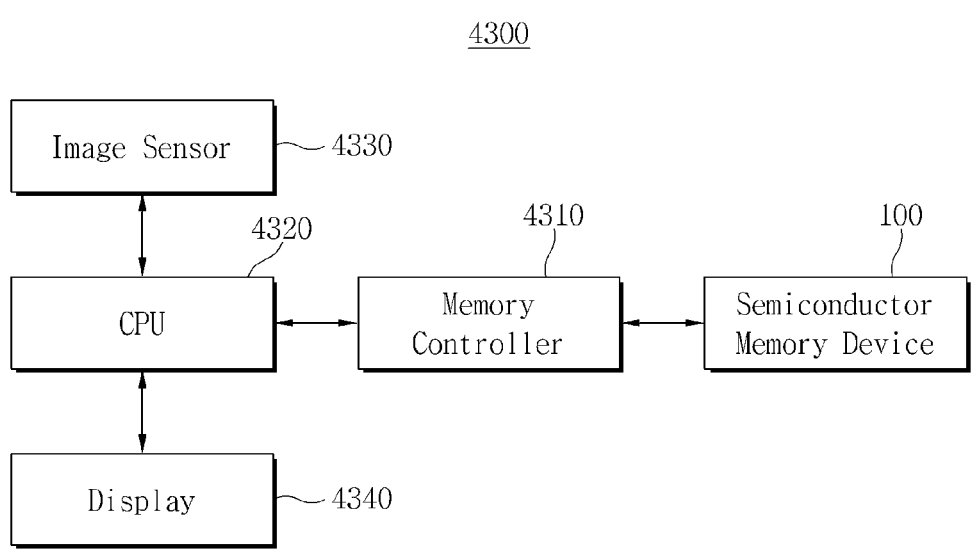
FIG. 18 is a block diagram illustrating still another example of a computer system that may include the semiconductor memory device shown in FIG. 1 or 5, according to an embodiment of the present inventive concept.

FIG. 18 is a block diagram illustrating still another example of a computer system 4300 that may include the semiconductor memory device 100 or 200 shown in FIG. 1 or 5, according to an embodiment of the present inventive concept.

Referring to FIG. 18, the computer system 4300 may be implemented, for example, as an image processing device such as a digital camera, or a mobile telephone, a smart phone, or a tablet PC that is equipped with a digital camera.

The computer system 4300 may include the semiconductor memory device 100 and a memory controller 4310 configured to control a data processing operation of the semiconductor memory device 100, e.g. a writing or reading operation. The computer system 4300 may further include a CPU 4320, an image sensor 4330, and a display 4340.

The image sensor 4330 of the computer system 4300 may convert an optical image into a digital signal. The converted digital signal may be transferred to the CPU 4320 or the memory controller 4310. Under the control of the central processing unit 4320, the converted digital signal may be displayed on the display 4340 or may be stored in the semiconductor memory device 100 using the memory controller 4310.

Additionally, data stored in the semiconductor memory device 100 may be displayed on the display device 4340 under the control of the CPU 4320 or the memory controller 4310. According to an embodiment, the memory controller 4210 may be configured to control an operation of the semiconductor memory device 100 and may be implemented, for example, as a part of the CPU 4220 or in another chip in addition to the CPU 4220.

As described above, a semiconductor memory device and a memory system that includes the semiconductor memory device, according to the embodiments of the inventive concept, may be allowed to request access to a host (e.g. a memory controller).

Although a few embodiments of the present general inventive concept have been shown and described, it will be appreciated by those skilled in the art will that changes may be made in these embodiments without departing from the the principles and spirit of the general inventive concept, the scope of of which is defined in the appended claims and their equivalents.

What is claimed is:

1. A memory system, comprising:
   first and second memory devices, wherein the first memory device is a volatile memory device and the second memory device is a nonvolatile memory device;
   a first memory controller configured to control the second memory device, to store a request signal to access the first memory device, and to generate an interrupt signal; and
   a host configured to receive the request signal in response to the interrupt signal and to cause first data to be transferred from the second memory device to the first memory device,
   wherein first memory controller is configured to generate the interrupt signal if the first data is part of data that is divisionally stored in the second memory device and a buffer of the first memory controller.

2. The memory system of claim 1, wherein the first memory controller is a nonvolatile memory controller.

3. The memory system of claim 1, wherein the host includes a host queue configured to store the request signal, and wherein the host queue is configured to operate as a FIFO memory.

4. The memory system of claim 1, wherein the request signal includes information about a place from which data is read, a place in which the data is stored, and a size of the data.

5. The memory system of claim 1, wherein the host includes a second memory controller configured to control the first memory device.

6. The memory system of claim 2, wherein the first memory controller includes a memory queue configured to store at least a command to access the first memory device.

7. The memory system of claim 2, wherein the host is configured to transfer data from at least one of the first memory device to the second memory device, and the data from the second memory device to the first memory device.

8. The memory system of claim 3, wherein the host queue is configured to store a command fetched by the host.

9. The memory system of claim 7, wherein the data includes metadata of the nonvolatile memory device.

10. The memory system of claim 7, wherein the first and second memory devices are implemented in a multi-chip package.

11. A method of driving a memory system having first and second memory devices, a memory controller configured to control the second memory device, and a host configured to control the memory controller, the method comprising:
    storing a request signal, which is used to access the first memory device, in the memory controller;
    transferring an interrupt signal to the host; and
    executing the request signal in response to the interrupt signal for transferring first data from the second memory device to the first memory device,
    wherein the interrupt signal is transferred to the host if the first data is part of data that is divisionally stored in the second memory device and the memory controller.

12. The method of claim 11, further comprising: storing the request signal in the host.

13. The method of claim 12, further including:
    executing the request signal for transferring second data from the first memory device to the second memory device.

14. A memory system, comprising:
    a long-term memory and a temporary memory; and
    a first memory controller and a second memory controller,
    wherein the first memory controller is configured to send a first signal to the second memory controller, the second memory controller is configured to fetch, responsive to the first signal, a second signal from the first memory controller and to cause, responsive to the second signal, first data to be transferred from the long-term memory to the temporary memory, and
    wherein the first memory controller is further configured to send the first signal if the first data is divisionally stored in the long-term memory and a buffer of the first memory controller.

15. The memory system of claim 14, wherein the first data includes metadata having information about a position of second data and a range of the second data.

16. The memory system of claim 14, wherein the first memory controller is further configured to send the second signal from a queue of the first memory controller to a register of the first memory controller.

17. The memory system of claim 14, wherein the long-term memory, the temporary memory, and the first memory controller are collectively packaged as a semiconductor memory device.

* * * * *